United States Patent
Kimura et al.

(10) Patent No.: US 8,285,124 B2
(45) Date of Patent: Oct. 9, 2012

(54) INFORMATION RECORDING/REPRODUCING APPARATUS

(75) Inventors: Youji Kimura, Kawasaki (JP); Yasuhiko Isobe, Kawasaki (JP); Takashi Kogure, Kawasaki (JP); Hiroyuki Taguchi, Kawasaki (JP); Shoichi Haijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 616 days.

(21) Appl. No.: 12/350,425

(22) Filed: Jan. 8, 2009

(65) Prior Publication Data
US 2009/0180754 A1 Jul. 16, 2009

(30) Foreign Application Priority Data
Jan. 10, 2008 (JP) .................. 2008-003555

(51) Int. Cl.
*H04N 5/76* (2006.01)
(52) U.S. Cl. ..................................... 386/295
(58) Field of Classification Search .......... 386/291, 386/295, 296
See application file for complete search history.

(56) References Cited

U.S. PATENT DOCUMENTS
2006/0227686 A1 * 10/2006 Nakade ................. 369/53.2
2006/0248203 A1 * 11/2006 Yamaoka et al. ......... 709/228

FOREIGN PATENT DOCUMENTS
JP 2005-328485 11/2005
* cited by examiner

*Primary Examiner* — Thai Tran
*Assistant Examiner* — William Tran
(74) *Attorney, Agent, or Firm* — Fujitsu Patent Center

(57) ABSTRACT

An information recording/reproducing apparatus includes a registration unit that registers scheduling information to periodically record information; a recording unit that records the information on a recording medium based on the scheduling information; a reproduction unit that reproduces the information recorded on the recording medium; a deletion unit that deletes the information according to a deletion instruction from the recording medium; and an erasure unit that erases, when the number of times of reproducing the information according to the deletion instruction is zero, the scheduling information associated with the information from the registration unit.

5 Claims, 3 Drawing Sheets

INFORMATION RECORDING/REPRODUCING APPARATUS

BACKGROUND OF THE INVENTION

The disclosures made herein relate to an information recording/reproducing apparatus which enables scheduling of periodic recording of information such as audio or video.

There has conventionally been available an information recording/reproducing apparatus such as a video tape recorder (VTR), a DVD recorder, or a hard disk recorder which enables scheduled recording of a television broadcast program (television program). In the information recording/reproducing apparatus of this type, a user operates the information recording/reproducing apparatus to set (register) scheduling information containing designation of a recording target channel or a time window in the information recording apparatus (scheduling setting). Then, when the time of starting recording arrives, the information recording/reproducing apparatus is activated based on the scheduling information to automatically record a designated channel program until recording end time. When the recording ends, the scheduling information is automatically erased.

Television programs include a serial program (such as serial drama) which is broadcast periodically, for example, every day or every week. To deal with recording of such a serial program, an information recording/reproducing apparatus has been developed, which can carry out setting to repeat scheduled recording at a cycle such as every day or every week (repeated scheduled recording setting). In this information recording/reproducing apparatus, once information for repeated scheduled recording setting (hereinafter, referred to as "repeated scheduling information") is set (registered), the repeated scheduling information is not erased after execution of one automatic recording operation. The information recording/reproducing apparatus periodically carries out repeated scheduled recording at the set cycle. Thus, the user does not have to carry out cumbersome work such as setting of scheduling information for each broadcasting of the serial program.

However, in the conventional information recording/reproducing apparatus, the repeated scheduling information is not erased unless the user actively carries out an erasure operation. In the conventional information recording/reproducing apparatus, the recorded data deletion and the scheduling information erasure are operations independent of each other. Thus, in the case of erasing certain scheduling information and deleting recorded data recorded based on the scheduling information from the recording medium, the user has to carry out these operations separately from each other.

Thus, the conventional information recording/reproducing apparatus has the following problems. For example, it is presumed that the user has recorded a favorite serial program (serial drama) by using repeated scheduled recording setting, and the serial program has finished. In this case, the repeated scheduled recording is continued irrespective of program changes unless the user erases repeated scheduling information regarding the serial program. Accordingly, when the user does not wish to view a new program started after the end of the serial program, useless recording is carried out. Thus, the user is required to erase the repeated scheduling information. However, if the user has registered many pieces of scheduling information, discovery of scheduling information which the user wishes to erase may be difficult.

The following is a related art to the present invention.
[Patent document 1] Japanese Patent Laid-Open Publication No. 2005-328485.

SUMMARY OF THE INVENTION

An object of the disclosures made herein is to provide a technology capable of reducing a load of erasing scheduling information on a user compared with the conventional case.

According to a first aspect of the disclosures made herein, an information recording/reproducing apparatus includes: a registration unit that registers scheduling information to periodically record information; a recording unit that records information on a recording medium based on the scheduling information; a reproduction unit that reproduces the information recorded on the recording medium; a deletion unit that deletes information according to a deletion instruction from the recording medium; and an erasure unit that erases, when the number of times of reproducing the information according to the deletion instruction is zero, scheduling information associated with this information from the registration unit.

According to a second aspect of the disclosures made herein, a scheduling information automatic erasure method, which is performed by an information recording/reproducing apparatus which records information on a recording medium and reproduces the information recorded on the recording medium, includes: registering scheduling information to periodically record information; recording information on the recording medium based on the scheduling information; deleting information according to a deletion instruction from the recording medium; and erasing, when the number of times of reproducing the information according to the deletion instruction is zero, registration of scheduling information associated with the information.

According to a third aspect of the disclosures made herein, a program controls a computer to execute the steps of: registering scheduling information to periodically record information; recording information on a recording medium based on the scheduling information; deleting information according to a deletion instruction from the recording medium; and erasing, when the number of times of reproducing the information according to the deletion instruction is zero, registration of scheduling information associated with this information.

According to the first to third aspects, when the number of times of reproducing information according to the deletion instruction is zero, the information can be regarded as unnecessary. Accordingly, scheduling information associated with this information can be regarded as scheduling information to record unnecessary information. Thus, erasure of the scheduling information in association with deletion of the information enables elimination of time and labor of erasing unnecessary scheduling information. As a result, a work load associated with user's scheduling information erasure can be reduced.

In the third aspect, in the step of erasing registration of scheduling information associated with this information, scheduling information used for recording video information whose number of reproducing times according to the deletion instruction is zero may be determined to be the associated scheduling information.

Further, in the third aspect: the information contains video information of a television broadcasting program; the scheduling information contains a day of a week, a time window, and a channel number for recording the video information; and in the step of erasing registration of scheduling information associated with this information, scheduling information where a day of a week, a time window, and a channel number for recording the video information whose number of reproducing times according to the deletion instruction is zero are matched may be determined to be the associated scheduling information associated with this information. Alternatively, the scheduling information further contains specific information of a program of video information to be recorded, and scheduling information where a day of a week, a time window, a channel number, and program specific information for recording the video information whose number of reproducing times according to the deletion instruction is zero are matched is determined to be the associated scheduled information.

The method of deciding the associated scheduling information according to the third aspect is applicable to the first and second aspects. As a fourth aspect, a computer readable recording medium in which the program of the third aspect is recorded may be provided.

According to the disclosures made herein, a technology capable of reducing the load of erasing scheduling information on the user can be provided.

DETAILED DESCRIPTION OF THE PREFERRED EMBODIMENTS

Figure 1:
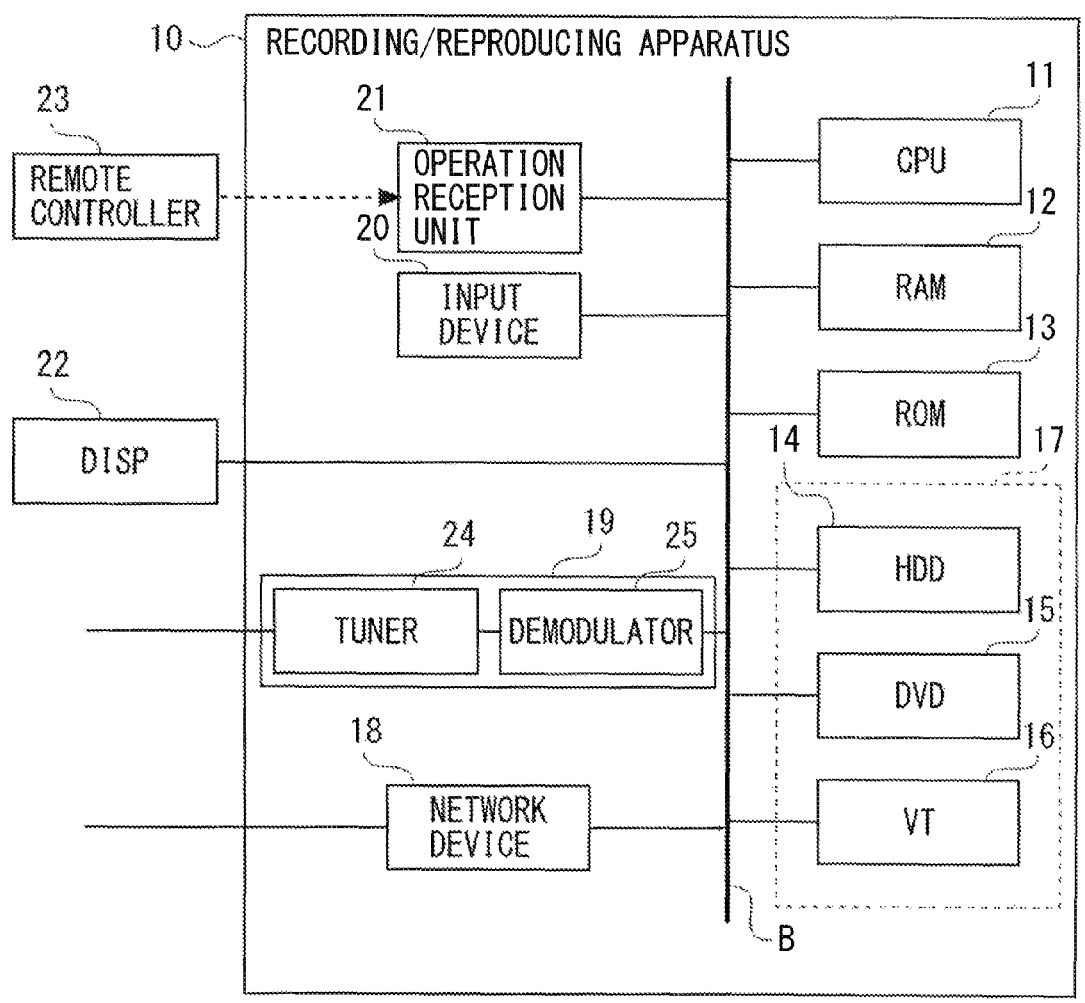
FIG. 1 is a diagram illustrating a configuration example of a recording/reproducing apparatus according to an embodiment of the disclosures made herein.

The embodiment of the disclosures made herein will be described below referring to the drawings. A configuration of the embodiment described below is only exemplary, and thus the present invention is not limited to the configuration of the embodiment.

FIG. 1 illustrates a configuration example of an information recording/reproducing apparatus of an embodiment of the disclosures made herein. FIG. 1 illustrates a composite-type information recording/reproducing apparatus 10 (hereinafter, referred to as "recording/reproducing apparatus 10") which is an information recording/reproducing apparatus. The recording/reproducing apparatus 10 can record a television program and reproduce the recorded program on a plurality of types of recording media such as a hard disk (HD), a DVD, and a video tape (VT). The recording/reproducing apparatus 10 can also record and reproduce a program downloaded via a network.

Specifically, the recording/reproducing apparatus 10 includes a central processing unit (CPU) 11 which is a controller (processor), a main memory such as a random-access memory (RAM) 12 used as a work area of the CPU 11, a read-only memory (ROM) 13, a hard disk drive (HDD) 14, a device 15 that writes/reads data on a DVD (hereinafter, referred to as "DVD drive 15"), a device 16 that writes/reads data on a video tape (hereinafter, referred to as "video tape (VT) drive 16"), a network device 18 such as a LAN card, a receiver 19 that receives a television broadcasting wave (television broadcasting signal), an input device 20, and an operation reception unit 21. These plurality of units are interconnected via a bus B. In the recording/reproducing apparatus 10, a display device 22 is connected to the bus B via an interface (not shown).

At least one of the ROM 13 and the HDD 14 stores various programs such as an operating system (OS), a BIOS, a device driver, and an application program, and data used for executing each program. The CPU 11 loads the respective programs on the RAM 12 to execute them, thereby realizing various functions of the recording/reproducing apparatus 10, such as a recording function, a recording scheduling function (including registration or erasure of scheduling information), a deletion function of recorded data, and a reproduction function of video or audio.

The recording/reproducing apparatus 10 is operated by manually operating the input device 20 or a remote controller 23. The input device 20 and the remote controller 23 include buttons and keys to enter setting information for realizing various functions of the recording/reproducing apparatus 10. Operation information (setting information) entered from the input device 20 is transmitted to the CPU 11. The remote controller 23 can transmit the operation information entered to the remote controller 23 via, for example, infrared-ray communication to the operation reception unit 21. The operation reception unit 21 transmits the operation information to the CPU 11. The CPU 11 controls operations of the units according to the operation information, respectively, to realize the various functions. The CPU 11 can display, according to an operation of the input device 20 or the remote controller 23, a screen for guiding entry of the operation information on the display device 22.

The receiver 19 includes a tuner 24 and a demodulator 25, and is controlled by the CPU 11. A television broadcasting signal received by an antenna (not shown) is entered to the receiver 19, and a channel is selected by using the tuner 24. The receiver 19 carries out demodulation by using the demodulator 25 according to a broadcasting signal of the selected channel to generate a video signal (including audio signal and control signal). The generated video signal is transmitted to the display device 22 via the bus B, and the display device 22 displays and outputs video and audio based on the video signal. Thus, a user can view television broadcasting program (television program). The channel selection by the tuner 24 is controlled by the CPU 11 according to operation information entered by the user.

As described above, the recording/reproducing apparatus 10 includes a recording/reproducing unit 17 which includes a plurality of drives for the plurality of types of recording media, such as the HDD 14, the DVD drive 15, and the VT drive 16, and can record a television broadcasting program received by the receiver 19 by an optional drive (recording medium (HD, DVD, or video tape)) designated by the user.

The CPU 11 carries out recording according to recording operation information (recording instruction) entered by the user. The CPU 11 converts, after reception of the recording instruction, a video signal output from the receiver 19 at this time into a signal (compressed moving image data (including audio and control information)) compliant with a recording format of a recording medium designated by the user as occasion demands, and supplies the signal to the designated drive (one of HDD 14, DVD drive 15, and VT drive 16) via the bus B. The designated drive records (stores) the compressed moving image data on a recording medium of its own apparatus.

The CPU 11 reproduces the information according to the operation information of the reproduction instruction entered by the user. In other words, after reception of the reproduction instruction (including designation of recording medium, and designation of data to be reproduced (recorded program)) entered by the user, the CPU 11 instructs a corresponding drive to read desired data to be reproduced, and converts the compressed moving image data read from the drive into a video signal compliant with the display device 22 when necessary to supply the video signal to the display device 22. Thus, the user can view a reproduced video displayed on the display device 22.

The display device 22 may be a television receiver which includes a tuner and a demodulator. In this case, by allowing entry of television broadcasting signal received by the antenna to the display device 22, the user can view a desired program by the display device 22 alone. In this case, the user can view another program on the display device 22 while recording a program of a channel selected by the receiver 19 of the recording/reproducing apparatus 10.

The CPU 11 carries out scheduled recording setting of a program according to operation information (scheduling information) which the user has entered by operating the input device 20 or the remote controller 23. In other words, the CPU 11 displays the scheduled recording setting screen including a program list on the display device 22 according to the instruction of displaying the scheduled recording setting screen. Program list data is contained in, for example, a television broadcasting signal. When necessary, the CPU 11 can obtain the program list data to display it on the display device 22. The obtained program list data is stored in a storage area prepared on the RAM 12 or the HDD 14 and is updated when necessary.

The program list data is list data of a plurality of programs broadcast from each television station within a prescribed period, which contains attribute data such as channel numbers, channel reception frequencies, program ID's, program titles, and broadcast dates and time (broadcast year-month-day, day of week, and broadcast time window). The user refers to the program list on the scheduled recording setting screen to carry out scheduled recording setting of a program desired to be viewed. In this scheduled recording setting, the user designates a program desired to be recorded.

Then, the CPU 11 extracts attribute data of a designated program from the program list data, and registers scheduling information containing this attribute data in a prescribed scheduling information storage area formed on the RAM 12 or the HDD 14. In this case, the broadcast date and time contained in the attribute data are registered as scheduling date-time information (scheduled recording day (year-month-day and day of week), and recording time window (recording start time and end time). The CPU 11 adds a management number as identification information to the scheduling information registered in the scheduling information storage area.

During scheduled recording setting, the CPU 11 inquires of the user about execution/nonexecution of periodical (cyclical) repeated scheduled recording. For example, the CPU 11 displays options of "EVERY DAY RECORDING", "EVERY WEEK RECORDING", and "ONLY ONCE (SINGLE)" on the display device 22 to receive user's selection result.

If the option of "ONLY ONCE" is selected, the CPU 11 automatically erases the relevant scheduling information when automatic recording based on the scheduling information is finished. In contrast, if the option of "EVERY DAY RECORDING" is selected, the CPU 11 adds an attribute of "EVERY DAY RECORDING" to scheduling date-and-time information of the scheduling information. In this case, the CPU 11 carries out scheduled recording of a scheduled recording day based on the scheduling date-and-time information, and records broadcast contents of a designated channel in a recording time window on a following day of the scheduled recording day and every day thereafter.

If the option of "EVERY WEEK RECORDING" is selected, the CPU 11 adds an attribute of "EVERY WEEK RECORDING" to the scheduling date-and-time information of the scheduling information. In this case, the CPU 11 carries out scheduled recording of a scheduled recording day based on this scheduling date-and-time information, and records broadcast contents of a designated channel in a recording time window of a day of a week of the scheduled recording day on a following week of the scheduled recording day and every week thereafter. Scheduling information of repeated scheduled recording to which an attribute of "EVERY DAY RECORDING" or "EVERY WEEK RECORDING" is added will be referred to as "REPEATED SCHEDULING INFORMATION" hereinafter.

The CPU 11 carries out automatic recording according to scheduling information. In other words, when a recording start date and time defined in the scheduling information arrive, the CPU 11 is automatically activated to record video data of a designated channel on a designated recording medium, and continues such recording until recording end time.

The CPU 11 updates a program ID and a program title of the repeated scheduling information each time execution of scheduled recording based on the repeated scheduling information is finished. In other words, the CPU 11 automatically carries out scheduling setting of a following day or a following week when scheduled recording based on the repeated scheduling information is finished. In this case, while a channel number and scheduling date-and-time information of the repeated scheduling information are fixed, if a program ID or a program title is changed, the repeated scheduling information is updated by the changed program ID or program title.

In the case of erasing (canceling registration) the scheduling information or the repeated scheduling information, the user carries out scheduled erasure setting. In other words, the user loads a scheduled erasure screen (not shown) in the display device 22 to enter an erasure instruction of desired scheduling information. Then, the CPU 11 erases corresponding scheduling information or repeated scheduling information. Such scheduled erasure setting by the user enables erasure of registered scheduling information or repeated scheduling information.

In the recording/reproducing apparatus 10 of this embodiment, the user can automatically erase related repeated scheduling information in association with erasure of recorded data recorded on the recording medium.

Figure 2:
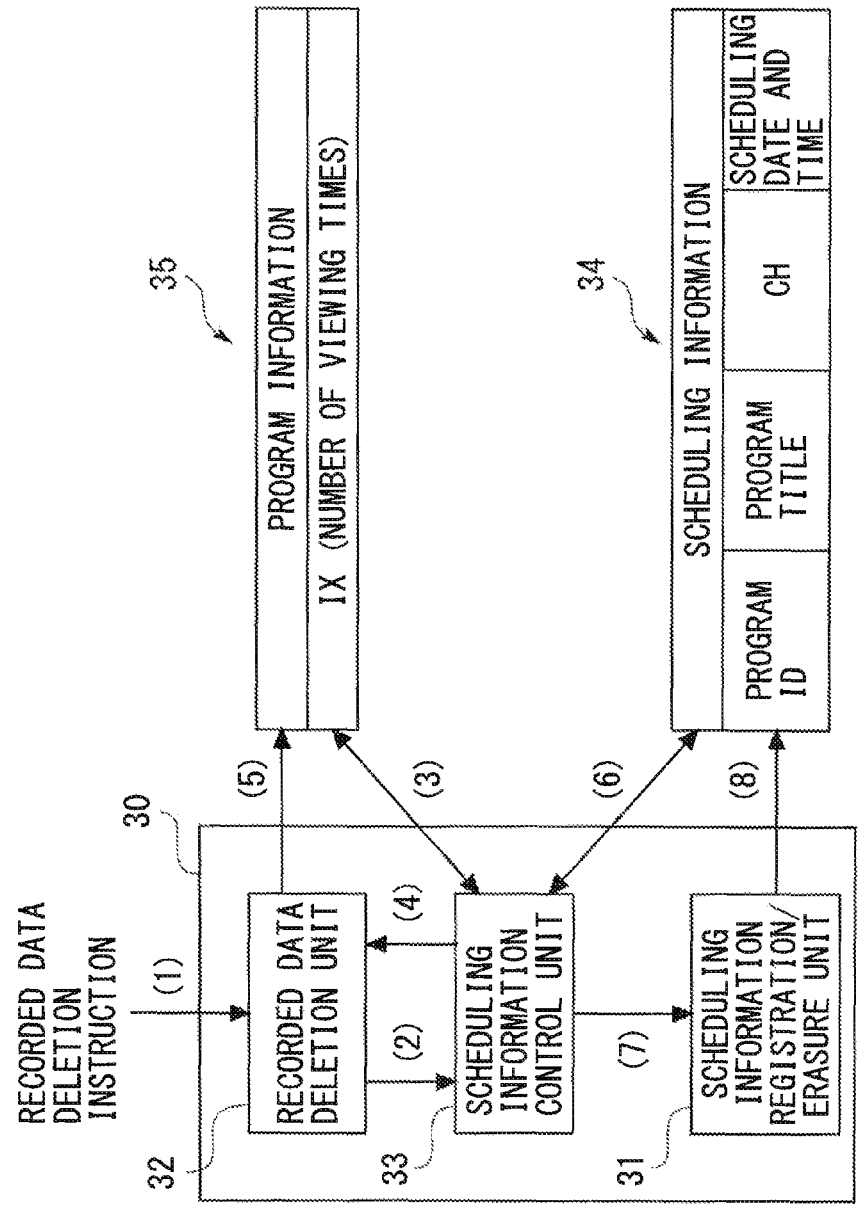
FIG. 2 is a diagram for explaining an automatic erasure function of repeated scheduling information associated with deletion of recorded data in the recording/reproducing apparatus.

FIG. 2 is a diagram schematically illustrating an automatic erasure function of scheduling information associated with deletion of recorded data. As illustrated in FIG. 2, the CPU 11 can function, by executing an application program 30 stored in the RAM 12 or the HDD 14, as a device which includes a scheduling information registration/erasure unit 31, a recorded data deletion unit 32, and a scheduling information control unit 33.

The scheduling information registration/erasure unit 31 registers scheduling information or repeated scheduling information in a scheduling information storage area according to recording scheduling setting. FIG. 2 schematically illustrates scheduling information (repeated scheduling information) registered in the scheduling information storage area.

Scheduling information 34 illustrated in FIG. 2 contains, as attribute data, a program ID, a channel (CH) number, all or a part (e.g., first 5 characters) of a program title, and scheduling date-and-time information (scheduled recording day, recording time window, and "EVERY DAY RECORDING" or "EVERY WEEK RECORDING"). The attribute data can further include information such as a channel reception frequency. The scheduling information registration/erasure unit 31 can erase the registered scheduling information 34 according to scheduling erasure setting. Single scheduling information is differentiated from repeated scheduling information in containing no additional attribute such as "EVERY DAY RECORDING" or "EVERY WEEK RECORDING".

The recorded data deletion unit 32 deletes recorded data (compressed moving image (including voice) data) recorded on a recording medium according to a recorded data deletion instruction entered by the user. In the recording medium, attribute information of the recorded data is stored together with the recorded data.

FIG. 2 schematically illustrates attribute information stored in the recording medium. Attribute information 35 illustrated in FIG. 2 contains program information of the recorded data, and the number of viewing times. The program information is generated based on the attribute data of programs of the program list, and can contain a channel number of a recorded program, a channel reception frequency, all or a part of a program title, a program ID, and a broadcasting date and time (year-month-day, day of week, and time window). In this case, it is assumed that the program information contains a program ID, all or a part of a program title, a channel number, and a broadcasting date and time (year-month-day, day of week, and time window) as in the case of the attribute data of the scheduling information 34. The number of viewing times is the number of times of reproducing recorded data. Its initial value is zero (0), and is incremented by 1 for each reproduction of recorded data.

The scheduling information control unit 33 retrieves erasable scheduling information (related scheduling information) according to deletion of the recorded data, and instructs, if scheduling information to be erased is found, the scheduling information registration/erasure unit 31 to erase the scheduling information.

Figure 3:
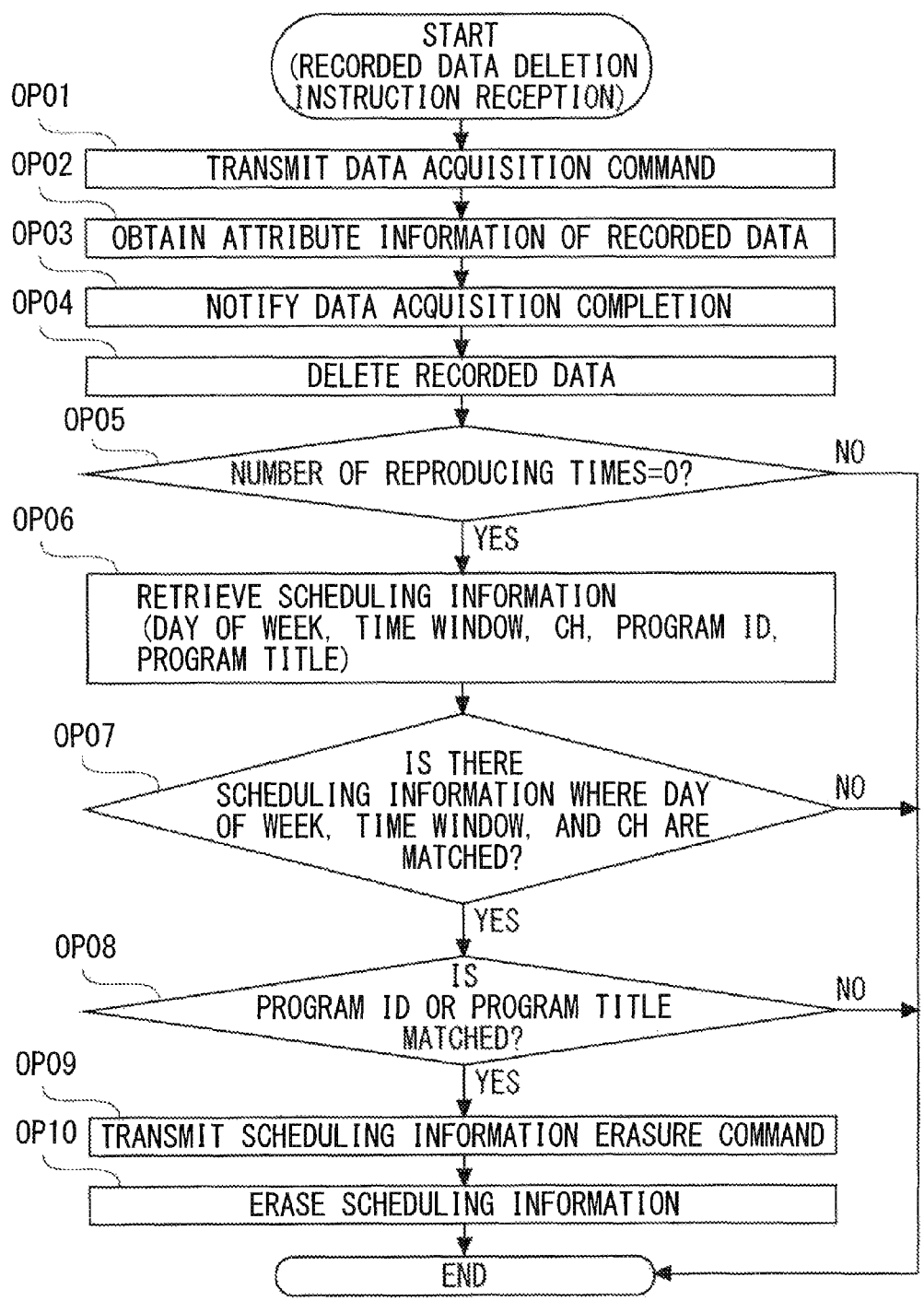
FIG. 3 is a flowchart illustrating a control flow of automatic erasure of the repeated scheduling information.

FIG. 3 illustrates control flow of operations (automatic scheduling information erasure) of the scheduling information registration/erasure unit 31, the recorded data deletion unit 32, and the scheduling information control unit 33 illustrated in FIG. 2. The operation (process) illustrated in FIG. 3 is started when the recorded data deletion unit 32 (CPU 11) receives a recorded data deletion instruction entered by the user (FIG. 2(1)).

As an example of a recording medium, a case where recorded data recorded in the HDD 14 is deleted will be described. However, even when a recording medium is a DVD or a video tape, contents of the process illustrated in FIG. 3 are not changed.

The recorded data deletion unit 32 that has received the recorded data deletion instruction transmits a data acquisition command to the scheduling information control unit 33 (OP01, FIG. 2(2)). The recorded data deletion instruction contains identification information of recorded data, and identification information of the recorded data is provided as a data acquisition command.

The scheduling information control unit 33 (CPU 11) that has received the data acquisition command obtains attribute information (program information and the number of viewing times) 35 of the recorded data corresponding to the identification information of the recorded data from the recording medium (HDD 14) (OP02, FIG. 2(3)).

Next, the scheduling information control unit 33 supplies a data acquisition completion notification to the recorded data deletion unit 32 (OP03, FIG. 2(4)). Then, the recorded data deletion unit 32 deletes the recorded data and the attribute information 35 corresponding to the deletion instruction from the HDD 14 (OP04, FIG. 2(5)).

After supplying the data acquisition completion notification to the recorded data deletion unit 32, the scheduling information control unit 33 determines whether the number of viewing times in the attribute information, in other words, the number of times of reproducing the recorded data is zero (0) (OP05). If the number of reproducing times is not zero (OP05, NO: number of reproducing times ≧1), the process illustrated in FIG. 3 is finished.

On the other hand, if the number of reproducing times is zero (OP05, YES), the scheduling information control unit 33 starts retrieval of repeated scheduling information related to the deleted recorded information from the scheduling information storage area (OP06), and retrieves repeated scheduling information where a day of a week, a time window, and a channel number contained in the program information of the attribute information 35 is matched. If no corresponding repeated scheduling information is found (OP07, NO), the process illustrated in FIG. 3 is finished determining that no related repeated scheduling information has been registered.

On the other hand, if corresponding repeated scheduling information is found (OP07, YES), the scheduling information control unit 33 obtains the repeated scheduling information 34 (FIG. 2(6)), and determines whether at least one of a program ID and a program title of this repeated scheduling information 34 matches the program ID or the program title of the program information of the attribute information 35 (OP08). In matching determination of the program titles, one of total matching and partial matching can be applied. In this case, whether first 5 characters of the program title of the repeated scheduling information 34 match first 5 characters of the program title of the attribute information 35 is determined.

If none of the program ID and the program title are not matched (OP08, NO), the process illustrated in FIG. 3 is finished, and the repeated scheduling information 34 is not deleted. On the other hand, if at least one of the program ID and the program title is matched (OP08, YES), the scheduling information control unit 33 decides the repeated scheduling information 34 as scheduling information related to the deleted recorded data, and supplies a scheduling information erasure command to the scheduling information registration/deletion unit 31 (OP09, FIG. 2(7)). As a scheduling information erasure command, for example, a program number added to the repeated scheduling information 34 is supplied to the scheduling information registration/deletion unit 31.

The scheduling information registration/deletion unit 31 that has received the scheduling information deletion command erases the repeated scheduling information 34 corresponding to this command from the scheduling information storage area (OP10, FIG. 2(8)). Accordingly, scheduled recording setting (scheduling information registration) related to the erased repeated scheduling information 34 is canceled to set a state where corresponding scheduled recording is not executed. When the process of OP10 is finished, the process illustrated in FIG. 3 is finished.

According to the recording/reproducing apparatus 10 of this embodiment, when the number of reproducing times of deletion target recorded data (recorded information) is zero (yet to be viewed), (registration of) repeated scheduling information related to this recorded data is erased.

When a serial program (e.g., serial drama) which the user has periodically (every day or every week) recorded by repeated scheduled recording setting is finished, and the user does not wish to view a new program started to be subsequently broadcast, the user does not view (reproduce) the new program. Thus, repeated scheduling information to record such a new program is unnecessary for the user.

According to the recording/reproducing apparatus 10 of this embodiment, automatic erasure of such repeated scheduling information relieves the user of work of finding and erasing repeated scheduling information to be deleted. Stopping unnecessary continuance of scheduled recording enables efficient use of the recording area of the recording medium.

The process illustrated in FIG. 3 can be changed as follows. In other words, the processes of OP04 and OP05 may be executed in parallel. Alternatively, the processes OP07 and OP08 may be simultaneously executed.

According to this embodiment, to accurately detect repeated scheduling information to be deleted, the processes OP07 and OP08 are both executed. Only one of the processes OP07 and OP08 may be executed, while both processes may be executed by user's selection setting. When the process OP07 is omitted, repeated scheduling information containing a part of a program ID or a program title matching deleted recorded data is erased irrespective of a scheduling date and time or a channel number.

When the step of OP08 is omitted, repeated scheduling information where a broadcasting day of a week, a time window, and a channel number of the deleted recorded data is matched is erased irrespective of broadcasting contents (program contents). This type of process is effective, for example, when the user stops recording and viewing before the final episode of a serial program reaches is aired. When only a recording day and a time window are designated without designating any program during scheduled recording setting, the process of OP08 is unnecessary.

This embodiment has described an example where the registered related to repeated scheduling information is automatically erased in association with deletion of the recorded data. As an alternative configuration, when the scheduling information control unit 33 (CPU 11) finds related repeated scheduling information, a screen for inquiring whether to delete the repeated scheduling information may be displayed on the display device 22, and whether to delete the repeated scheduling information may be determined according to user's selection entry (deletion or no).

This embodiment has been directed to the recording/reproducing apparatus capable of recording information on one of a plurality of types of recording media such as an HD, a DVD, and a video tape. However, inclusion of at least one recording medium and a recording/reproducing apparatus (drive) is only required. As a recording medium, a Blue-ray Disk may be applied. As information recorded on the recording medium, the television broadcasting video and audio information have been taken as examples. However, the present invention can be applied to, for example, a recording/reproducing apparatus for radio broadcasting audio information.

What is claimed is:

1. An information recording/reproducing apparatus, comprising:
    a registration unit that registers scheduling information to periodically record information;
    a recording unit that records and stores the information on a recording medium based on the scheduling information;
    a reproduction unit that reproduces the recorded information stored on the recording medium on an output device;
    a deletion unit that deletes the recorded information stored on the recording medium according to a deletion instruction; and
    an erasure unit that automatically erases the scheduling information used for recording the recorded information when the recorded information is deleted according to the deletion instruction and when the recorded information has not been reproduced once on the output device.

2. A scheduling information automatic erasure method performed by an information recording/reproducing apparatus which records information on a recording medium and reproduces the information recorded on the recording medium, the scheduling information automatic erasure method comprising:
    registering scheduling information to periodically record information;
    recording and storing the information on the recording medium based on the scheduling information;
    deleting the recorded information on the recording medium according to a deletion instruction; and
    automatically erasing the scheduling information used for recording the recorded information when the recorded information is deleted according to the deletion instruction and when the recorded information has not been reproduced once on an output device.

3. A non-transitory computer readable storage medium storing a program including a process to be executed by a computer, the process comprising:
    registering scheduling information to periodically record information;
    recording and storing the information on a recording medium based on the scheduling information;
    deleting the recorded information on the recording medium according to a deletion instruction; and
    automatically erasing the scheduling information used for recording the recorded information when the recorded information is deleted according to the deletion instruction and when the recorded information has not been reproduced once on an output device.

4. The non-transitory computer readable storage medium according to claim 3, wherein the information includes video information of a television broadcasting program,
    the scheduling information includes a day of a week, a time window, and a channel number for recording the video information, and
    the erasing erases the scheduling information in which the day of the week, the time window, and the channel number are used for recording the video information and whose recorded information is deleted are matched respectively as the scheduling information.

5. The non-transitory computer readable storage medium according to claim 4, wherein the scheduling information further includes specific information of a program of video information to be recorded, and
    the erasing erases the scheduling information in which a day of a week, a time window, a channel number, and program specific information are used for recording the video information and whose recorded information is deleted are matched respectively as the scheduling information.

* * * * *